(12) United States Patent
Tsang et al.

(10) Patent No.: US 8,584,335 B2
(45) Date of Patent: Nov. 19, 2013

(54) CONVENIENT-USED SECURING CLAMP

(75) Inventors: Kwai Yin Tsang, Hong Kong (CN); Tak Ming Chick, Hong Kong (CN)

(73) Assignee: Shenzhen Qichuangmei Technology Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 13/063,755

(22) PCT Filed: Jul. 13, 2010

(86) PCT No.: PCT/CN2010/075125
§ 371 (c)(1),
(2), (4) Date: Mar. 13, 2011

(87) PCT Pub. No.: WO2011/032422
PCT Pub. Date: Mar. 24, 2011

(65) Prior Publication Data
US 2012/0159757 A1 Jun. 28, 2012

(30) Foreign Application Priority Data
Sep. 16, 2009 (CN) .................... 2009 2 0204640 U

(51) Int. Cl.
*B23P 19/04* (2006.01)
*B25B 1/00* (2006.01)
*B25B 1/24* (2006.01)
*B23Q 3/02* (2006.01)

(52) U.S. Cl.
USPC .......... 29/237; 29/260; 269/3; 269/6; 269/95; 269/266

(58) Field of Classification Search
USPC ......... 29/237, 260; 269/3, 6, 95, 266; 81/483, 81/486, 418, 419, 420, 421–424, 424.5, 81/426, 426.5
See application file for complete search history.

(56) References Cited

U.S. PATENT DOCUMENTS
2,637,236 A * 5/1953 Vergnani et al. ................ 81/421

FOREIGN PATENT DOCUMENTS
BE          898254 A2 * 3/1984
CN       2673630 Y  *  1/2005
* cited by examiner

*Primary Examiner* — Monica Carter
*Assistant Examiner* — Nirvana Deonauth

(57) ABSTRACT

A convenient-used securing clamp comprises a pair of clamp hands, two distance-fixing clamps, two groups of throat pipe moulds and a mould base, wherein the distance-fixing clamp is a split structure that consists of two pieces which can be closed together or released; the throat pipe moulds are set inside the distance-fixing clamps with the same split structure, so as to be closed and released along with the distance-fixing clamps; the mould base is also the split structure, with its upper part connected with the distance-fixing clamps and the lower part connected with the pair of clamp hands, so that as the pair of clamp hands releases and closes, the mould base releases and closes.

2 Claims, 15 Drawing Sheets

CONVENIENT-USED SECURING CLAMP

BACKGROUND

1. Field of the Invention

The present invention pertains to a convenient-used securing clamp, specifically to a securing clamp that secures the throat pipes and related fittings connected with each other by means of hot-melting or electric-melting.

2. Brief Description of Related Arts

The way of how to joint the throat pipes of the PE, PPR used in a water supply and drainage system with other fittings is to heat and join the throat pipes with the fittings together through an electric melting or hot melting machine. Wait until cooling down, the joining areas of the throat pipes and the fittings melt together. Because the joining areas of the throat pipes and the fittings become soft when heated, they need to be fixed at their original places during cooling time without any movement; otherwise gaps in between the throat pipes and the fittings will appear, and thus get rise to water leaking, distortion or other possible problems.

The existing securing clamp for fixing the throat pipe and fittings that have been heated can not constrain the position of the pipe throat and fittings, so as to cause the joint to be displaced and become loose due to the contraction of materials when cooling down.

SUMMARY OF THE PRESENT INVENTION

The objective of the present invention is to furnish a convenient-used securing clamp, which ensures by fixing the place and angle of the joining areas that the joining areas would not be shifted so that the water leaking and distortion of the throat pipes occur, and thus guarantee the construction quality. Because the joining areas are fixed, other connecting works going on at the other end of the throat pipes can be started even if without cooling down, and therefore increase the construction efficiency.

According to the present invention, the convenient-used securing clamp comprises a pair of clamp hands, two distance-fixing clamps, two groups of throat pipe mould and a mould base, wherein the each distance-fixing clamp is a split structure that consists of two pieces which can be closed together or released; each distance-fixing clamp is set with a corresponding throat pipe mould with the same split structure inside it; the throat pipe mould is released and closed along with the distance-fixing clamps; the mould base is also the split structure with its upper part connected with the distance-fixing clamps and its lower part connected with the clamp hands, so that as the pair of clamp hands is released or closed, the mould base is released or closed, in turn the distance-fixing clamps are released or closed.

Another alternative technical project is that the convenient-used securing clamp comprises two pairs of clamp hands, two distance-fixing clamps, two groups of throat pipe mould, and a fixed positioning board, wherein each of the distance-fixing clamp is a split structure that consists of two pieces which can be closed together or released, and the distance-fixing clamp is set with a corresponding throat pipe mould with the same split structure inside it, so that the throat pipe mould is released or closed along with the distance-fixing clamps; the bottoms of the two distance-fixing clamps are connected to the two pairs of clamp hands respectively; the fixed positioning board, with positioning screw holes on it, is set on the sides of the two distance-fixing clamps for adjusting the angle of the distance-fixing clamps.

The two technical proposals described above can further include the following technical features.

The throat pipe mould inside the distance-fixing clamp consists of several, such as five sets of detachable throat pipe moulds with different diameter that are assembled together overlapped one after another in the sequence of from big to small.

Structure one comprises a pair of clamp hands, two distance-fixing clamps, two sets of throat pipe moulds, and a mould base, wherein the distance-fixing clamps are connected with the pair of clamp hands through the mould base so that the pair of clamp hands controls the distance-fixing clamp to be released or closed. The two distance-fixing clamps are set in parallel in their positions. The five sets of throat pipe moulds with different diameter are fixed through screws inside the distance-fixing clamps, including the diameters of 20 mm, 25 mm, 32 mm, 40 mm, 50 mm, and being assembled overlapped one after another in the sequence of from big to small. The throat pipe mould can be detached to match the size of the throat pipe that is to be put in.

Structure two comprises a pair of clamp hands, two distance-fixing clamp, two sets of throat pipe mounds, and a mould base, wherein the distance-fixing clamps are connected with the pair of clamp hands through the mould base so that the pair of clamp hands controls the distance-fixing clamp to be released or closed. The two distance-fixing clamps are put in such a manner that the angle between them is 135°. The five throat pipe moulds with different diameter are fixed through screws inside the distance-fixing clamps, including the diameters of 20 mm, 25 mm, 32 mm, 40 mm, 50 mm, and being assembled together overlapped one after another in the sequence of from big to small. The throat pipe mould can be detached to match the size of the throat pipe that is to be put in.

Structure three comprises a pair of clamp hands, two distance-fixing clamps, two sets of throat pipe moulds, and a mould base, wherein the distance-fixing clamps are connected with the pair of clamp hands through the mould base so that the pair of clamp hands controls the distance-fixing clamp to be released or closed. The two distance-fixing clamps are put in such a manner that the angle between them if 90°. The five throat pipe moulds with different diameter are fixed through screws inside the distance-fixing clamps, including the diameters of 20 mm, 25 mm, 32 mm, 40 mm, 50 mm, and being assembled together overlapped one after another in the sequence of from big to small. The throat pipe mould can be detached to match the size of the throat pipe that is to be put in.

Structure four comprises two pairs of clamp hands, two distance-fixing clamps, two sets of throat pipe moulds, and a fixed positioning board with screw holes, wherein the distance-fixing clamps are connected with the clamp hands through the mould base so that the clamp hands control the distance-fixing clamp to be released or closed. There are four screw holes set on the fixed positioning board, so that the distance-fixing clamps can be fixed at the different screw holes in order to adjust the different angles between the two distance-fixing clamps, such as in parallel, 135° or 90°. There are several throat pipe moulds with different diameter fixed inside the distance-fixing clamps through screws, including the diameters of 63 mm, 75 mm, 90 mm, 110 mm, 125 mm, 160 mm, 200 mm, and being assembled together overlapped one after another in the sequence of from big to small. The throat pipe mould can be detached to match the size of the throat pipe that is to be put in.

The securing clamp of the present invention has the advantages of durable, convenient-used, low cost because of the simple structure, and can be applied to the fittings with different size and shape.

These and other objectives, features, and advantages of the present invention will become apparent from the following detailed description, the accompanying drawings, and the appended claims.

Figure 1:
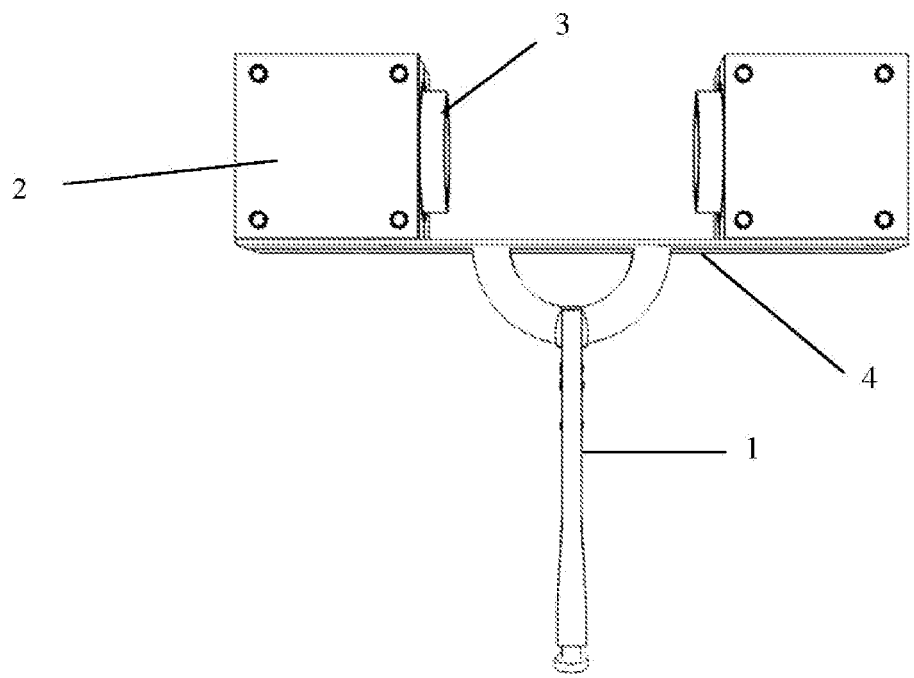
FIG. 1 is the front view of first embodiment of the present invention, showing the state when the distance-fixing clamps are closed.

In the drawings, reference number 1 represents the clamp hands, 2 represents the distance-fixing clamp, 3 represents the throat pipe mould, 4 represents the mould base, 5 represents the fixed positioning board, and 6 represents the screw holes.

DETAILED DESCRIPTION OF THE PREFERRED EMBODIMENTS

EXAMPLE I

This embodiment is for straight convenient-used securing clamps.

Figure 2:
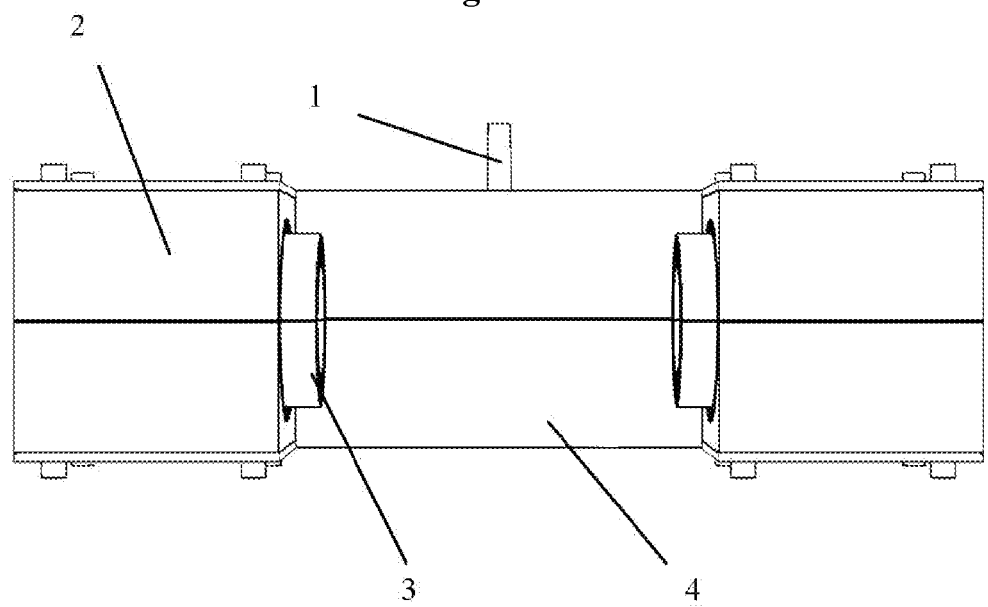
FIG. 2 is the vertical view of FIG. 1, showing the state when the distance-fixing clamps are closed.
Figure 3:
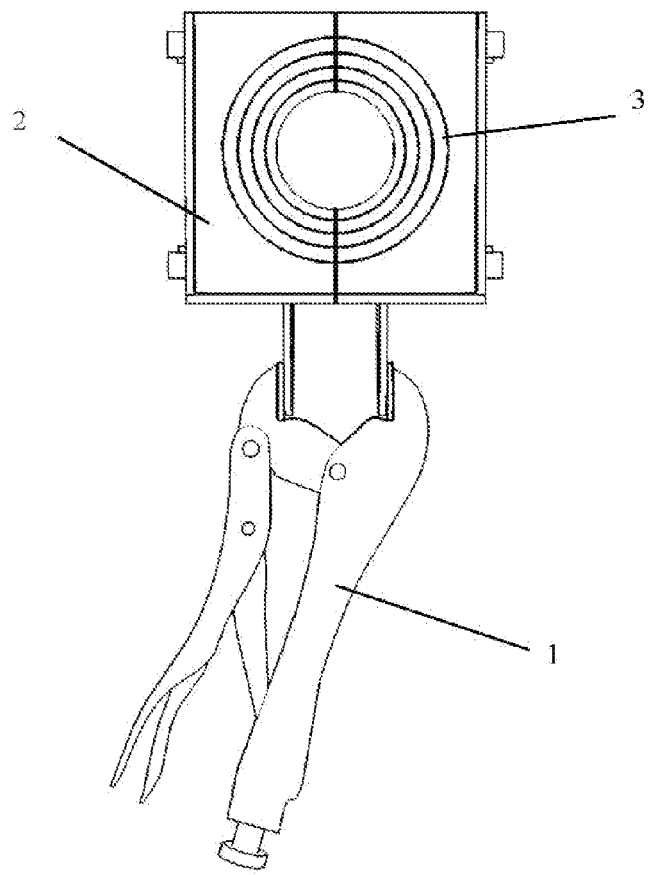
FIG. 3 is the side view of FIG. 1, showing the state when the distance-fixing clamps are closed.
Figure 4:
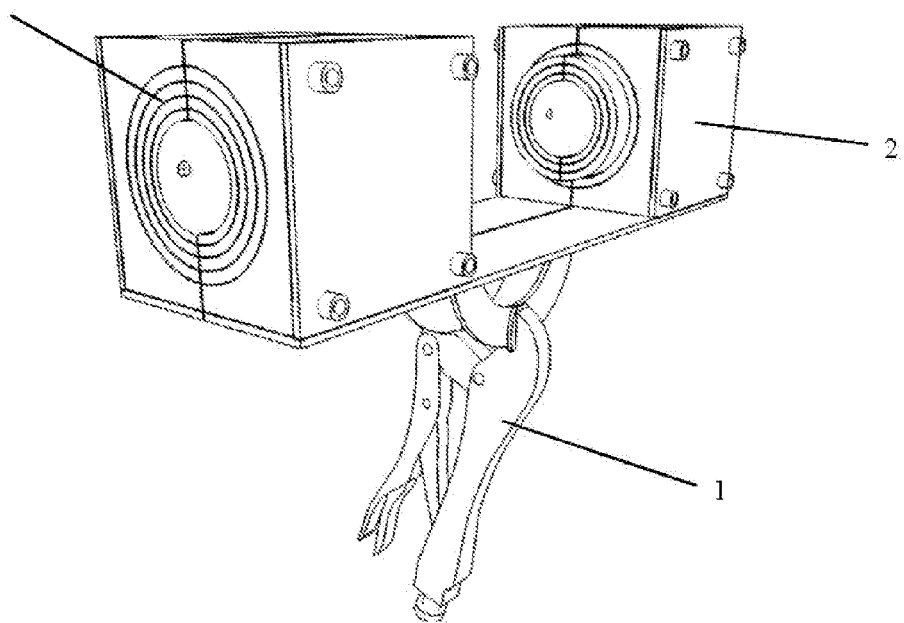
FIG. 4 is an oblique view of FIG. 1, showing the state when the distance-fixing clamps are closed.
Figure 5:
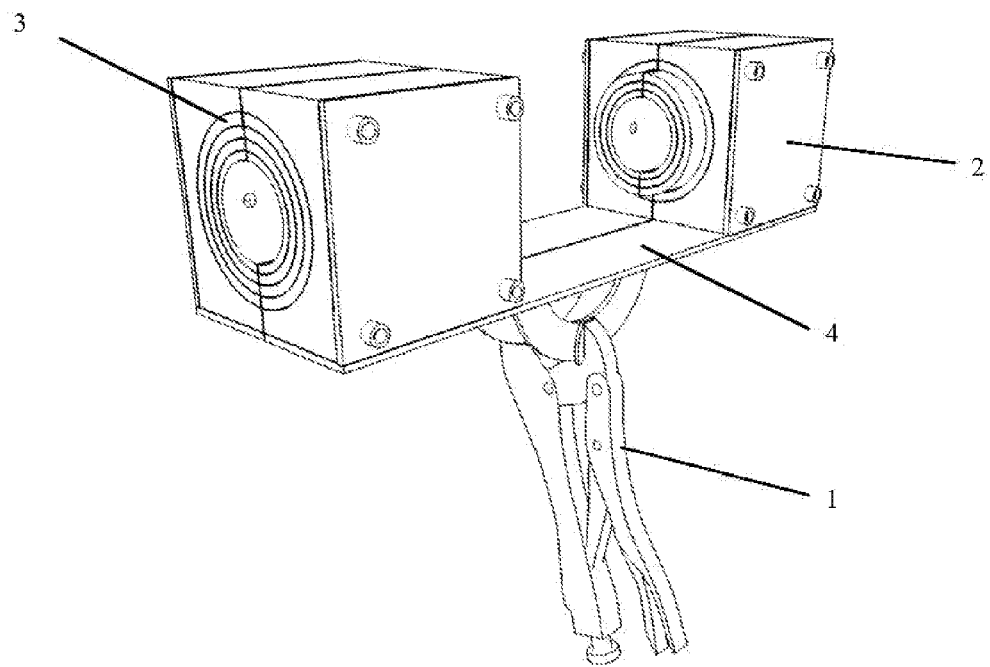
FIG. 5 is another oblique view of FIG. 1 from another angle, showing the state when the distance-fixing clamps are closed.
Figure 6:
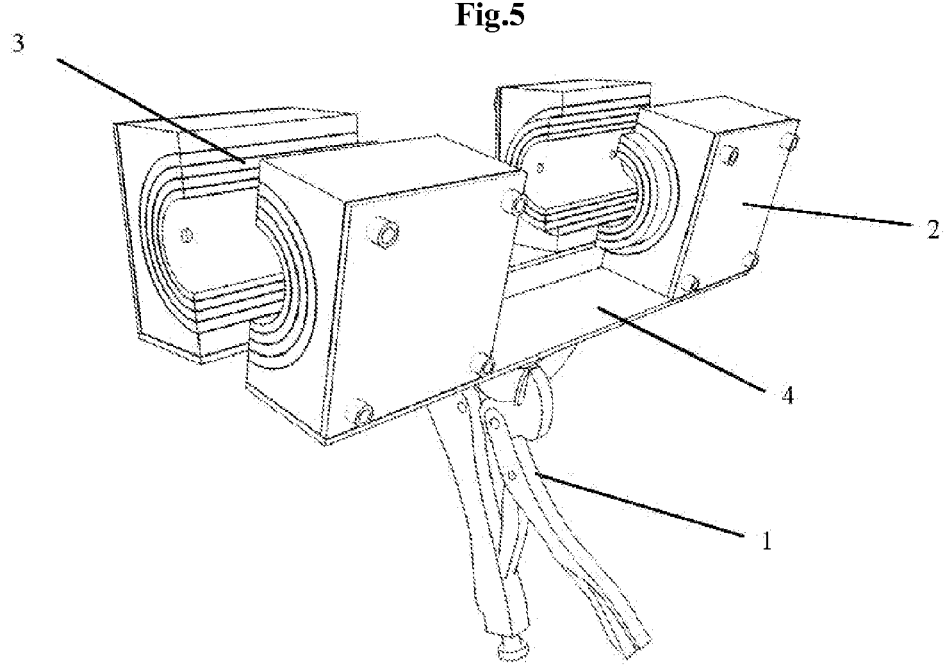
FIG. 6 is the oblique view of FIG. 1, showing the state when the distance-fixing clamps are released.

As shown in FIG. 1-FIG. 6, wherein if the electric-melting method is used as the joining method, the pair of clamp hands 1 is pulled open first to open the distance fixing clamp 2; then assemble the throat pipe and fittings together properly, and put them in between the two distance fixing clamps. Then close the clamp hand 1 together in order to close the two distance fixing clamps. Once the throat pipe and fittings are fixed properly in between the clamps, turn on the electrical melting machines to heat them. Wait until the joining areas cool down, then pull the clamp hand open again so as to open the distance fixing clamp 2 once again, and then take out the well-joined throat pipe and fittings. When apply the hot melt method for joining, pull the clamp hand open first so as to open the distance fixing clamp 2. Assemble the throat pipe and fittings and put them in between the two distance fixing clamps 2. After heated by way of the hot-melting, the pair of clamp hands 1 is closed so as to close the distance fixing clamp 2 as well, and accordingly fix the throat pipe and fittings in a certain place. Wait until the joining areas cool down, pull the pair of clamp hands open again to open the distance fixing clamp 2 once again, and take out the well-joined throat pipe and fittings. The two moulds 3 for the throat pipe could be attachable in order to match the throat pipe and fittings in different sizes. The straight convenient-used securing clamp is used to join fittings for being connected with water pipes, with the same or different diameter, and to join straight tridents.

EXAMPLE II

Figure 7:
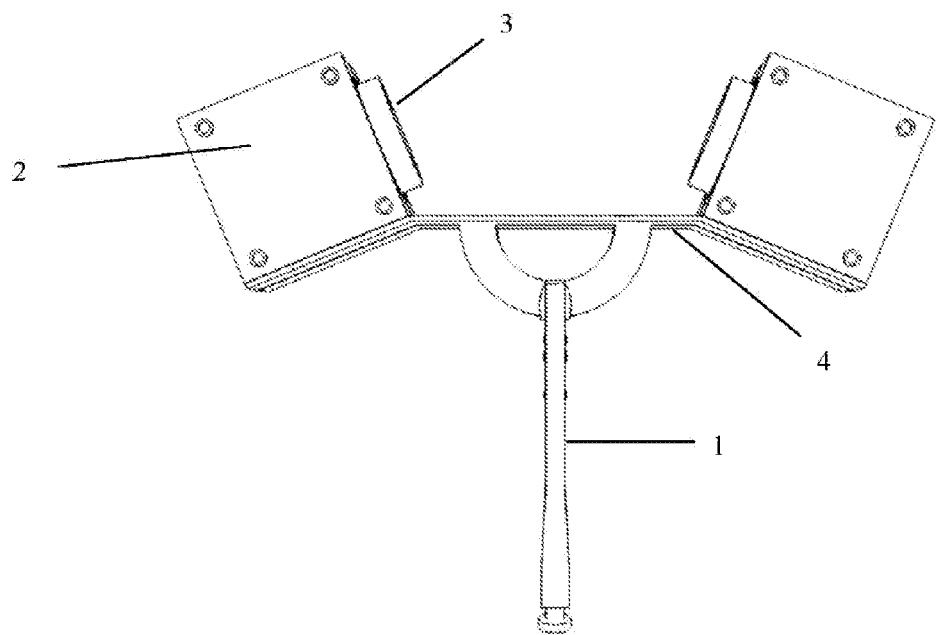
FIG. 7 is the front view of another embodiment of the present invention, showing the state when the distance-fixing clamps are closed.
Figure 8:
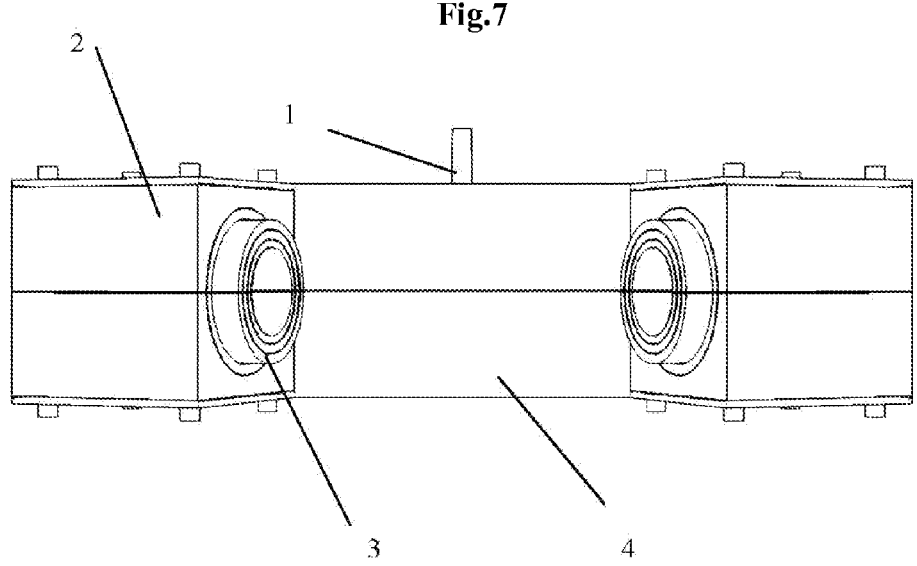
FIG. 8 is the vertical view of FIG. 7, showing the state when the distance-fixing clamps are closed.
Figure 9:
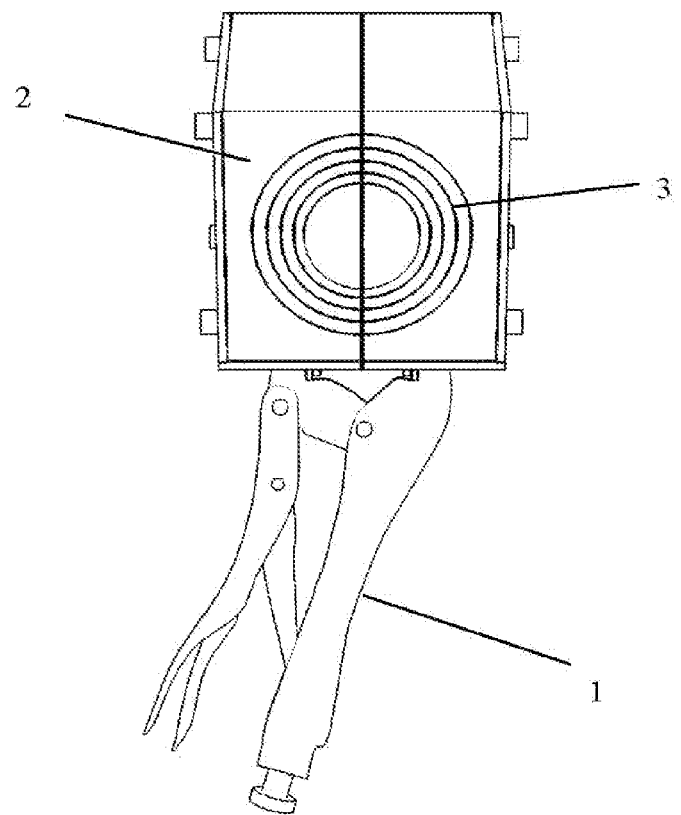
FIG. 9 is the side view of FIG. 7, showing the state when the distance-fixing clamps are closed.
Figure 10:
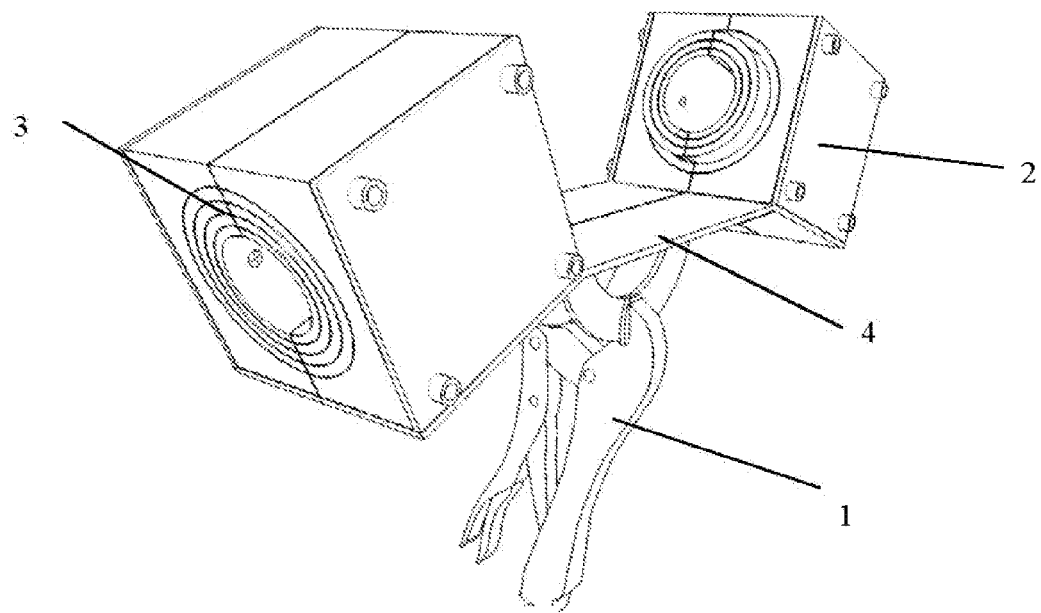
FIG. 10 is the oblique view of FIG. 7, showing the state when the distance-fixing clamps are closed.
Figure 11:
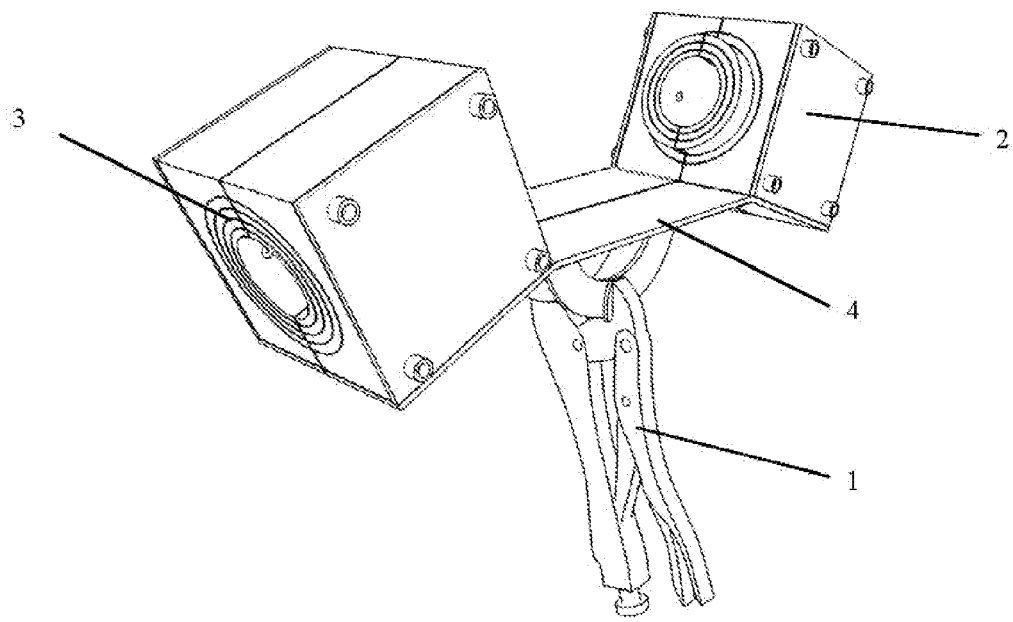
FIG. 11 is another oblique view of FIG. 7 from another angle, showing the state when the distance-fixing clamps are closed.
Figure 12:
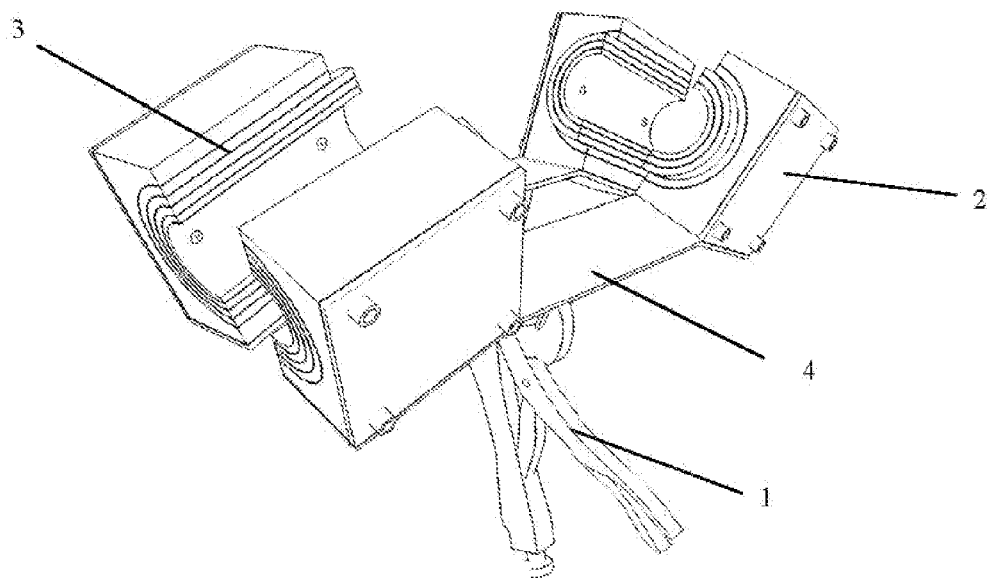
FIG. 12 is another oblique view of FIG. 7, showing the state when the distance-fixing clamps are released.

As shown in FIG. 7-FIG. 12, in this example, the two distance-fixing clamps are not installed in parallel relative to each other, so the clamp is a 45 degree securing clamp.

if the electric-melting is used as the joining method, the detailed operating process is as follows: the pair of clamp hands 1 is pulled open first to make the distance-fixing clamps 2 be opened; assemble the throat pipe and fittings together and put them in between the two distance-fixing clamps 2, and then close the pair of clamp hands 1 to make the distance-fixing clamps be closed; after the position of the throat pipe and fittings is fixed, turn on the electric melting machine to heat them; wait until the joining area cool down completely, then pull the pair of clamp hands 1 open again to open the distance-fixing clamps 2 and take out the well-connected throat pipe and fittings. If the hot-melting is used, the detailed operating process is as follows: the pair of clamp hands 1 is pulled open first to further open the distance-fixing clamps 2; assemble the throat pipe and fittings together and put them in between the two distance-fixing clamps 2; heat them with the hot-melting, and then close the pair of clamp hands 1 to close the distance-fixing clamps 2, in order to fix the position of the throat pipe and fittings; wait until the joint cool down completely, pull the pair of clamp hands 1 open again to open the distance-fixing clamps 2, and take out the well-connected throat pipe and fittings. The two throat pipe moulds 3 can be detached to match the different throat pipe and fittings with different size. The 45 degree convenient-used securing clamp is used to join 45 degree bend.

EXAMPLE III

Figure 13:
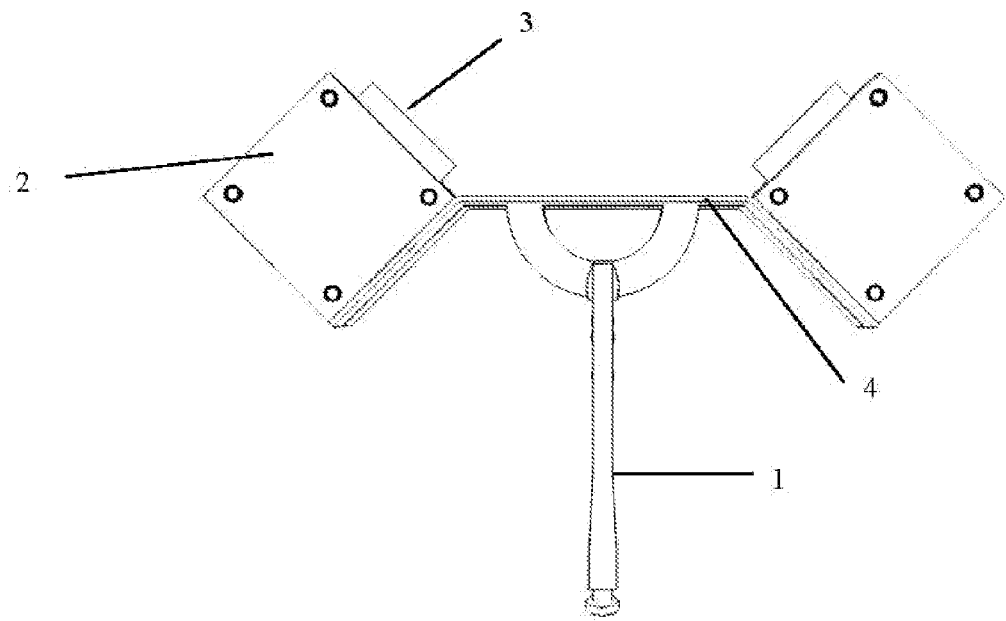
FIG. 13 is the front view of another embodiment of the present invention, showing the state when the distance-fixing clamps are closed.
Figure 14:
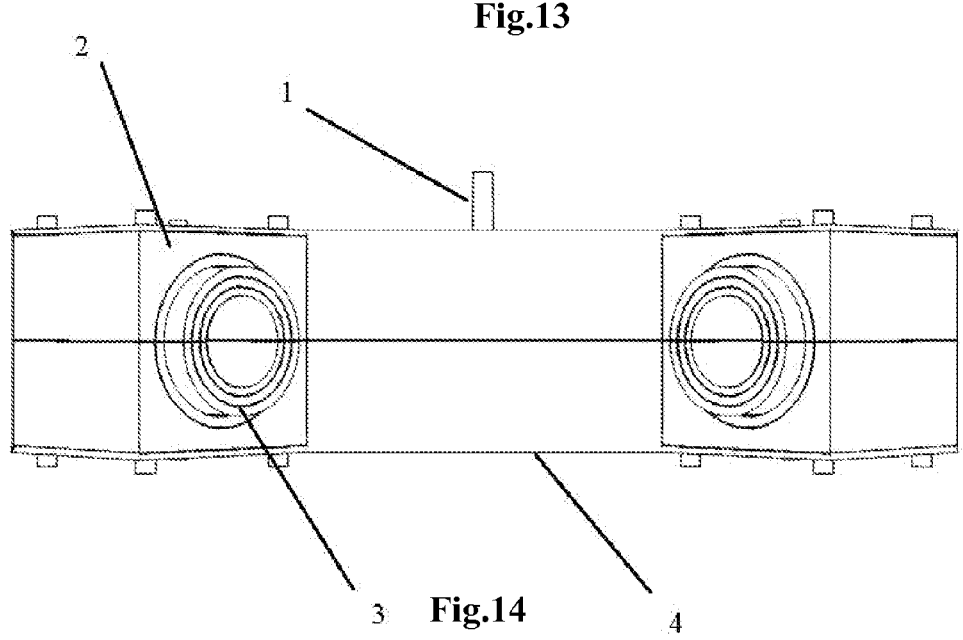
FIG. 14 is the vertical view of FIG. 13, showing the state when the distance-fixing clamps are closed.
Figure 15:
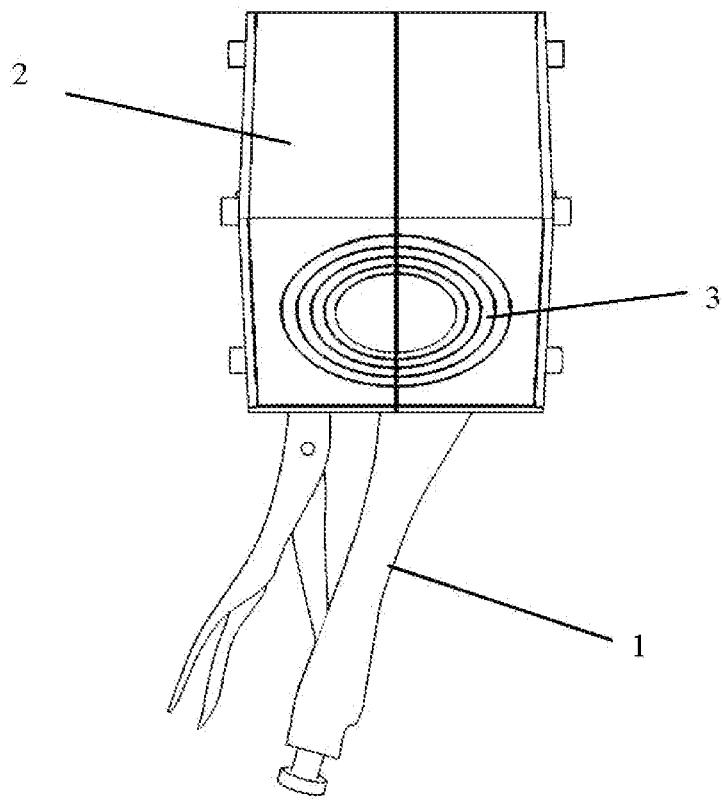
FIG. 15 is the side view of FIG. 13, showing the state when the distance-fixing clamps are closed.
Figure 16:
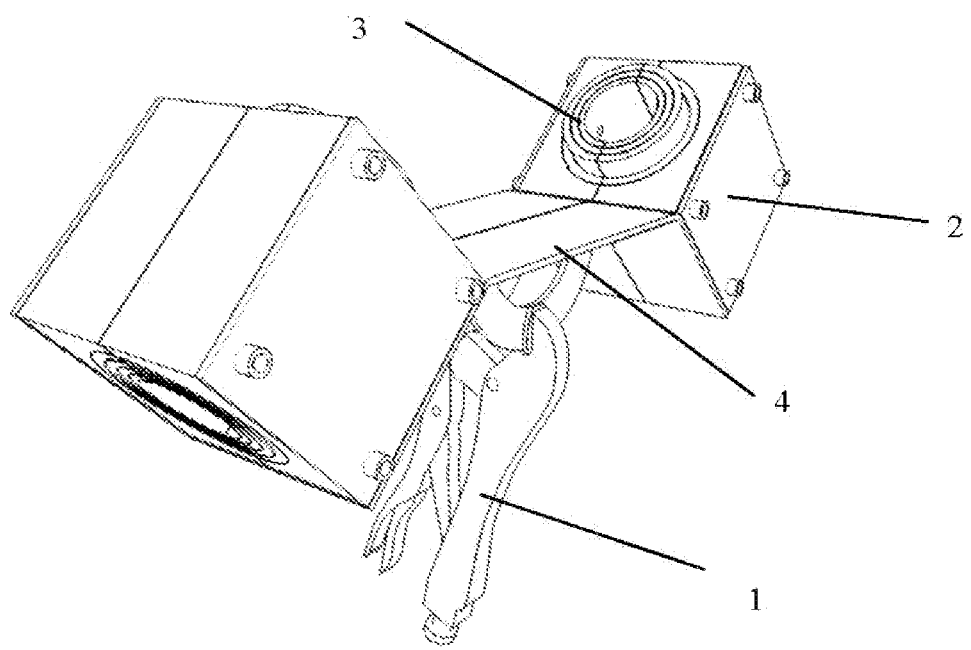
FIG. 16 is the oblique view of FIG. 13, showing the state when the distance-fixing clamps are closed.
Figure 17:
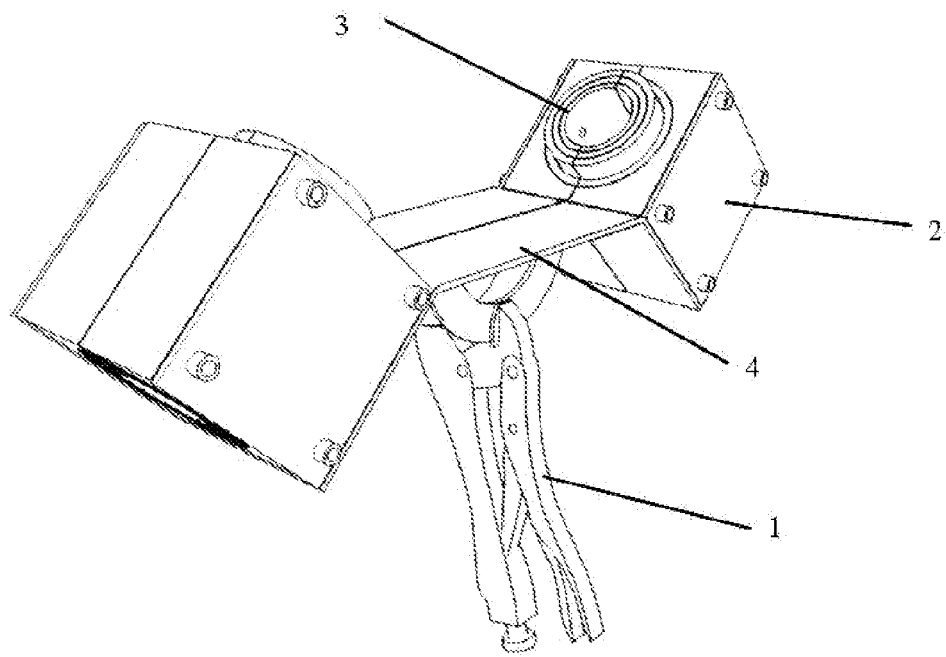
FIG. 17 is another oblique view of FIG. 14, showing the state when the distance-fixing clamps are closed.
Figure 18:
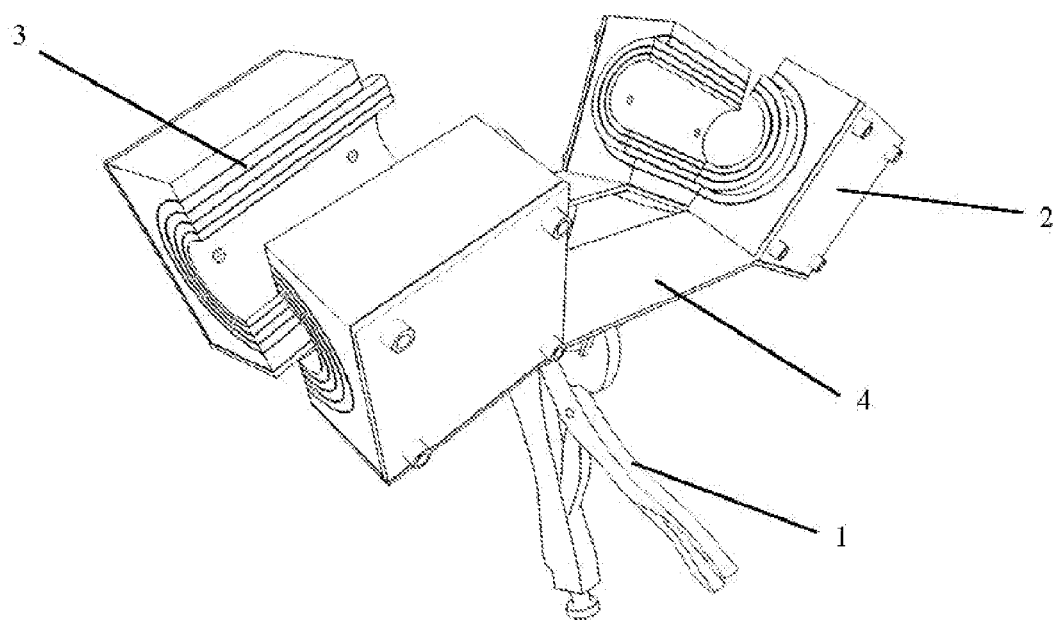
FIG. 18 is the oblique view of FIG. 13, showing the state of when the distance-fixing clamps are released.

As shown in FIG. 13-FIG. 18, in this example, the two distance-fixing clamps are not installed in parallel relative to each other; it is a 90 degree securing clamp.

If the electric-melting is used as the joining method, the detailed operating process is as follows: the pair of clamp hands 1 is pulled open first to open the distance-fixing clamps 2; assemble the throat pipe and fittings together and put them in between the two distance-fixing clamps 2, and then close the pair of clamp hands 1 to close the distance-fixing clamps; after the position of the throat pipe and fittings is fixed, turn on the electric melting machine to heat them; wait until the joint cool down completely, then pull the pair of clamp hands 1 open again to open the distance-fixing clamps 2 and take out the well-connected throat pipe and fittings. If the hot-melting is used, the detailed operating process is as follows: the pair of clamp hands 1 is pulled open first to further open the distance-fixing clamps 2; assemble the throat pipe and fittings together and put them in between the two distance-fixing clamps 2; heat them with the way of hot-melting and then close the pair of clamp hands 1 to close the distance-fixing clamps 2 in order to fix the position of the throat pipe and fittings; wait until the joint cool down completely, pull the pair of clamp hands 1 open again to open the distance-fixing clamps 2, and take out the well-connected throat pipe and fittings. The two throat pipe moulds 3 can be detached to match the different throat pipe and fittings with different size. The 90 degree convenient-used securing clamp is used to join 90 degree bend, and to join tridents with the same or different diameter.

EXAMPLE IV

Figure 19:
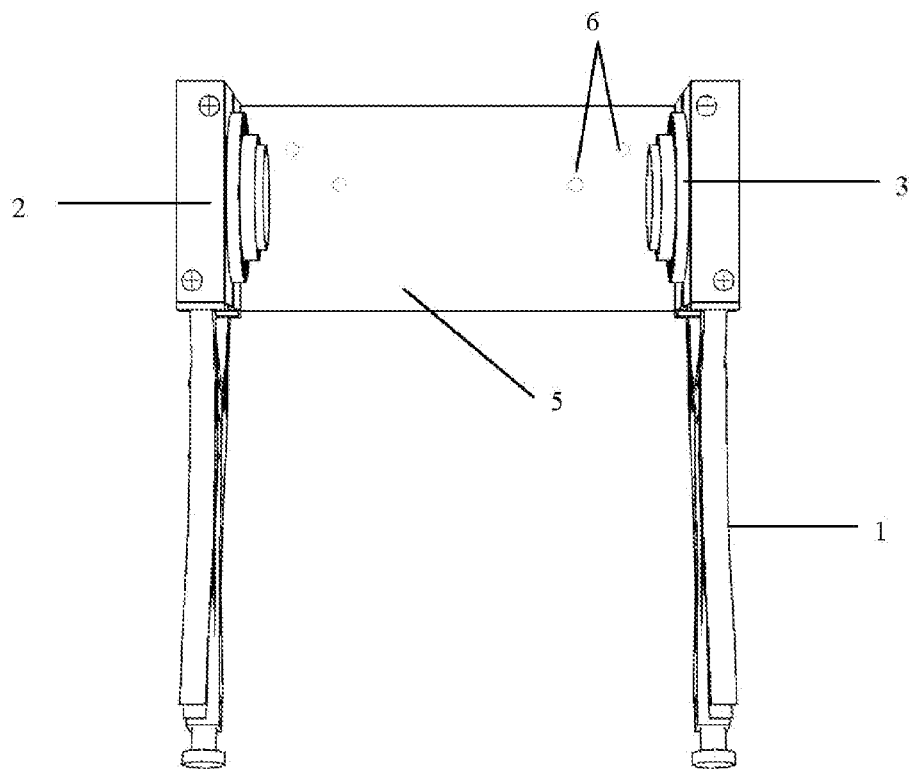
FIG. 19 is the front view of another embodiment of the present invention, showing the state of when the distance-fixing clamps are closed and are put in parallel in their relative positions.
Figure 20:
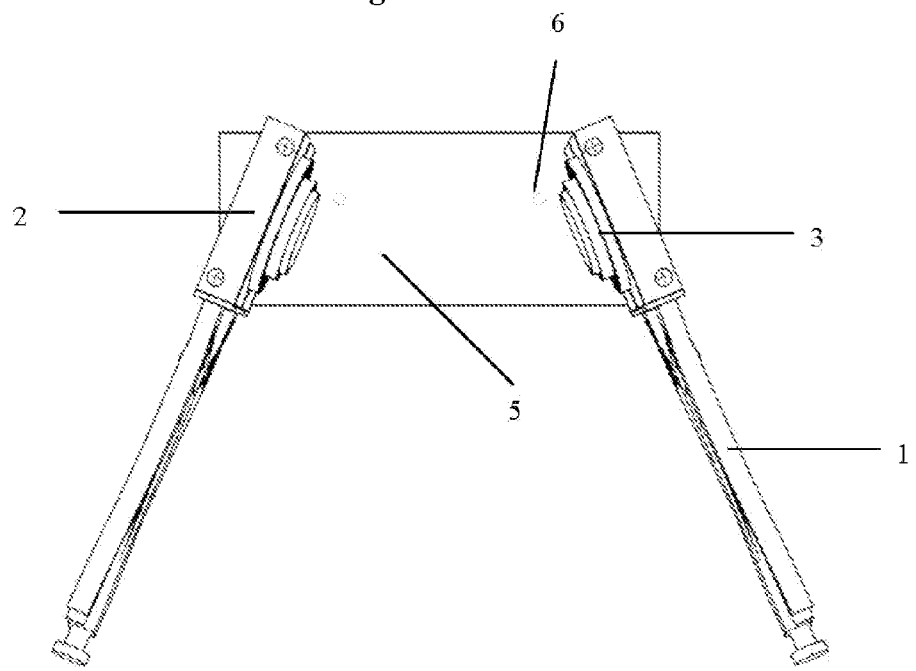
FIG. 20 is one front view of FIG. 19, showing the state of when the distance-fixing clamps are closed but put in such a manner that the angle between them is 135°.
Figure 21:
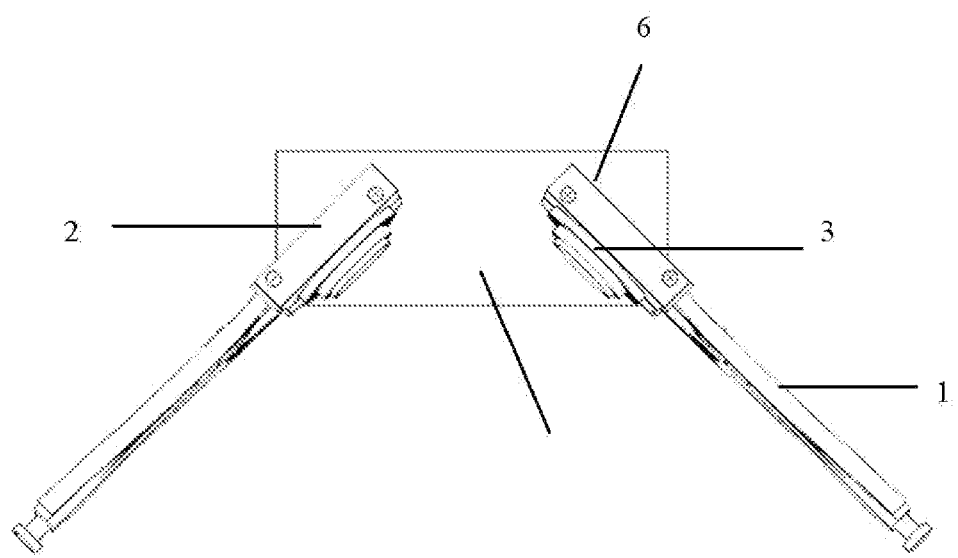
FIG. 21 is one front view of FIG. 19, showing the state of when the distance-fixing clamps are closed but put in such a way that the angle between them is 90°.
Figure 22:
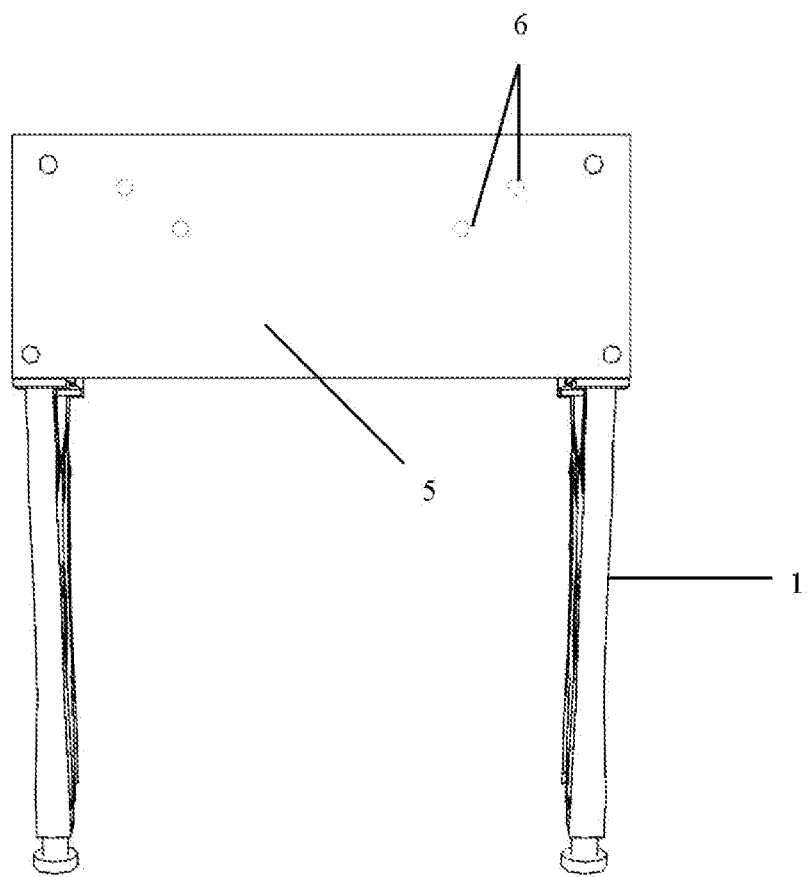
FIG. 22 is the back view of FIG. 19, showing the state of when the distance-fixing clamps are closed.
Figure 23:
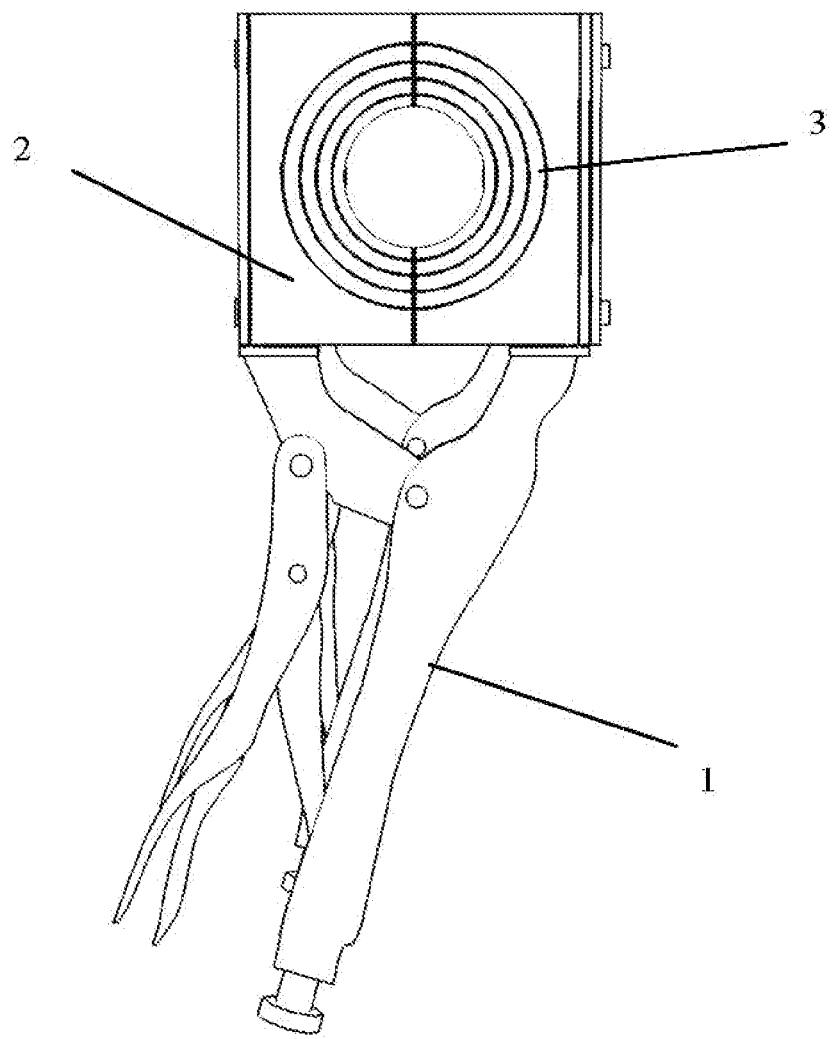
FIG. 23 is the side view of FIG. 19, showing the state of when the distance-fixing clamps are closed.
Figure 24:
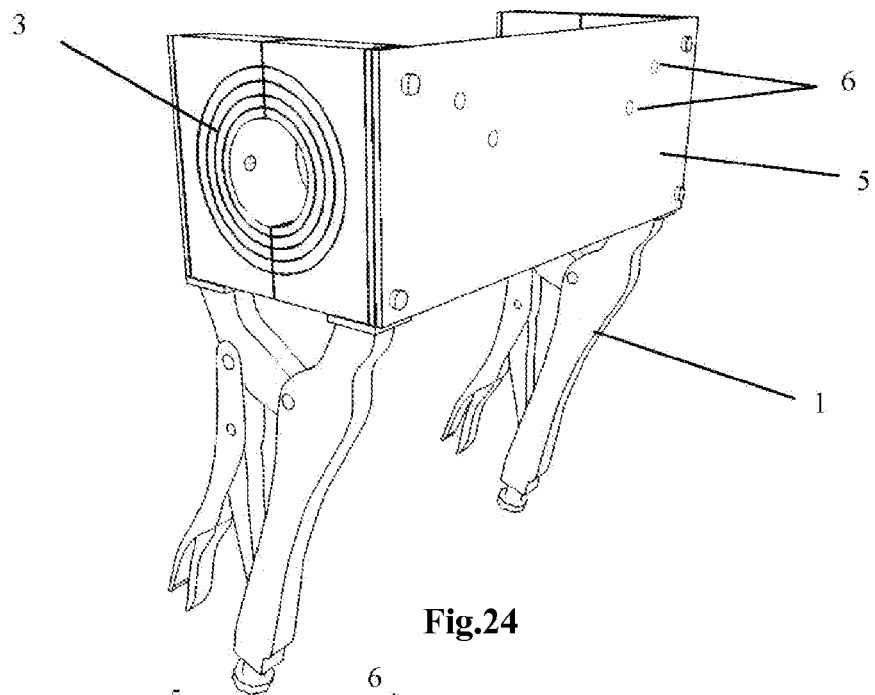
FIG. 24 is one oblique view of FIG. 19, showing the state of when the distance-fixing clamps are closed.
Figure 25:
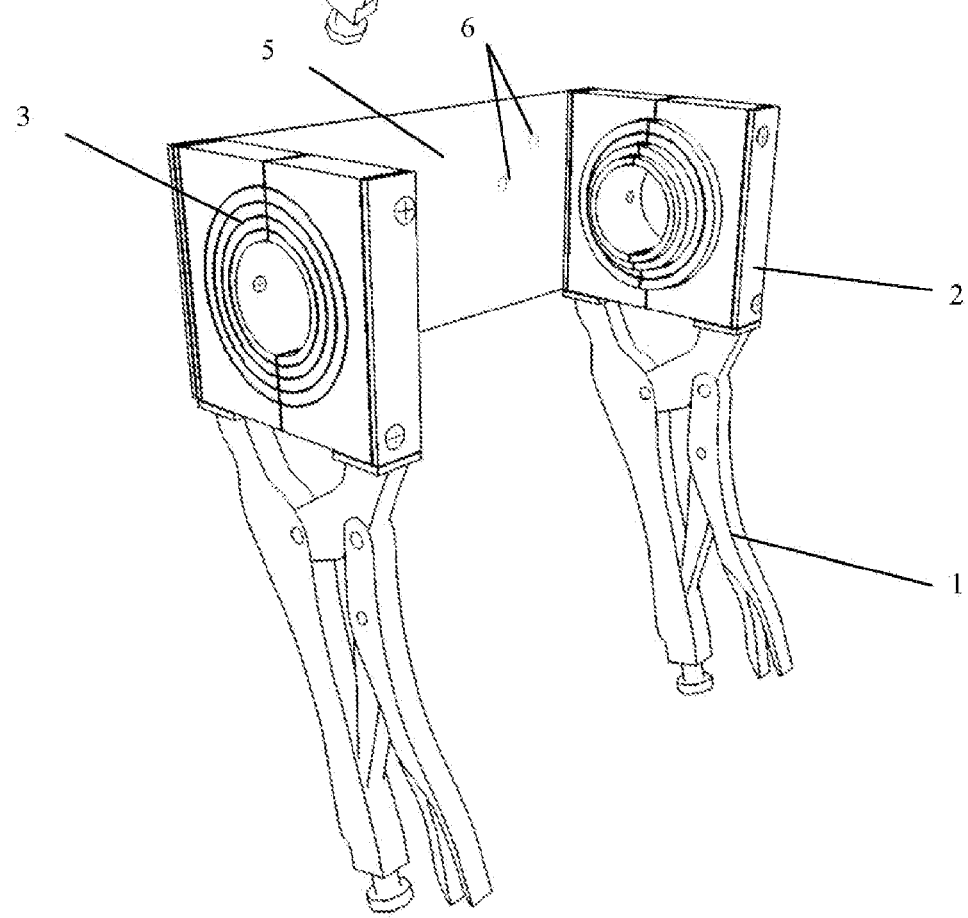
FIG. 25 is another oblique view of FIG. 19 seen from another angle, showing the state of when the distance-fixing clamps are closed.
Figure 26:
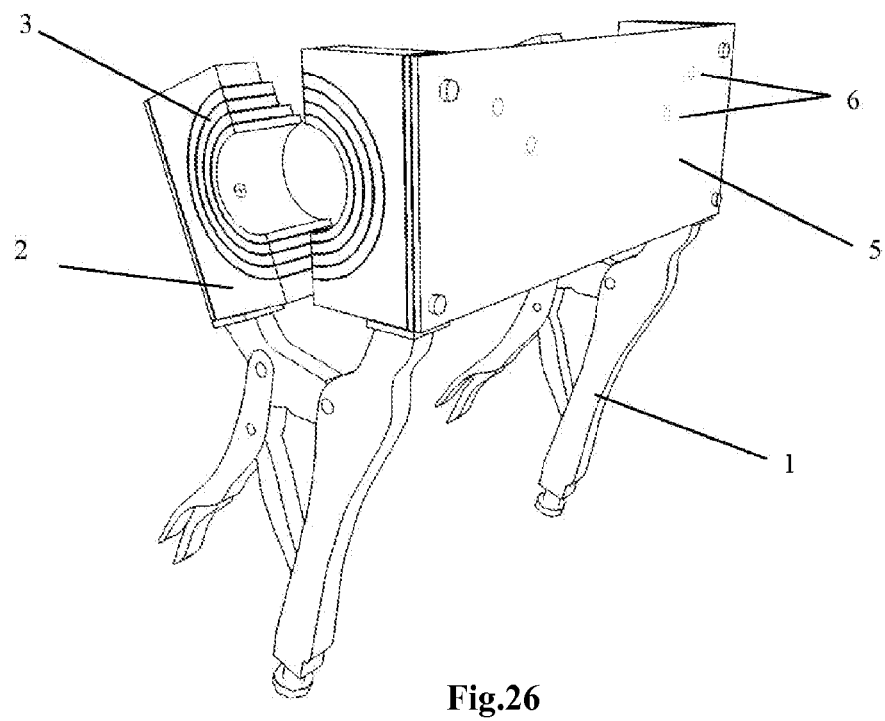
FIG. 26 is another oblique view of FIG. 19 seen from another angle, showing the state of when the distance-fixing clamps are released.
Figure 27:
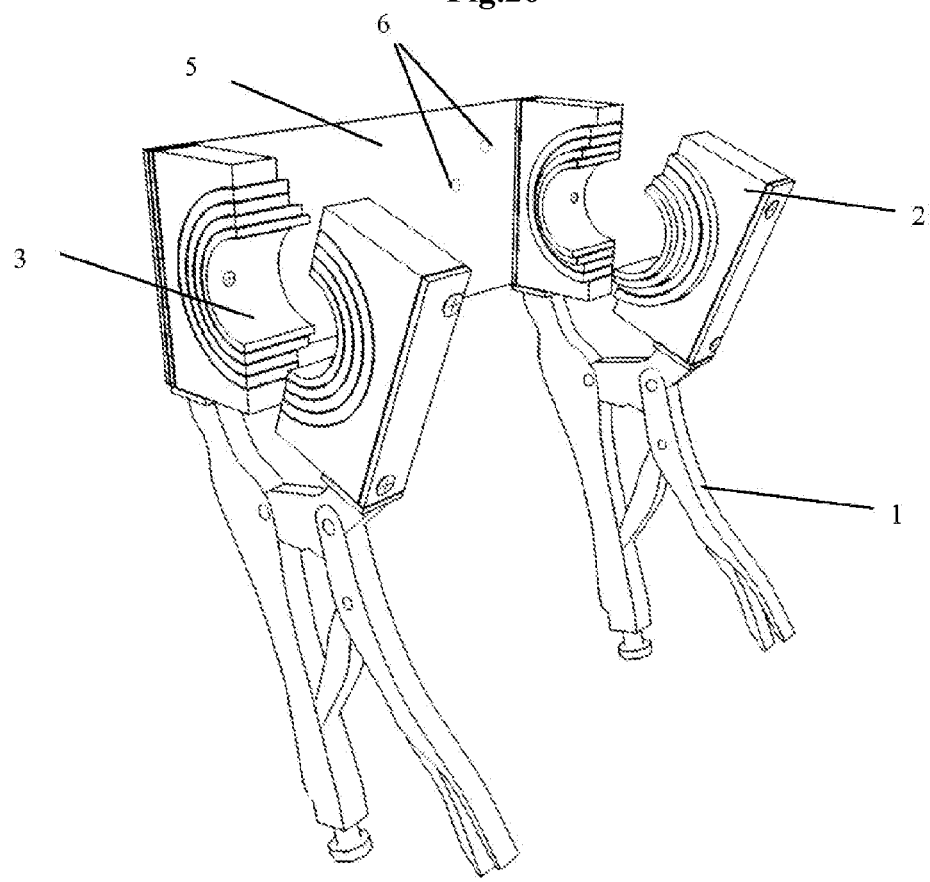
FIG. 27 is another oblique view of FIG. 19 seen from another angle, showing the state of when the distance-fixing clamps are released.
Figure 28:
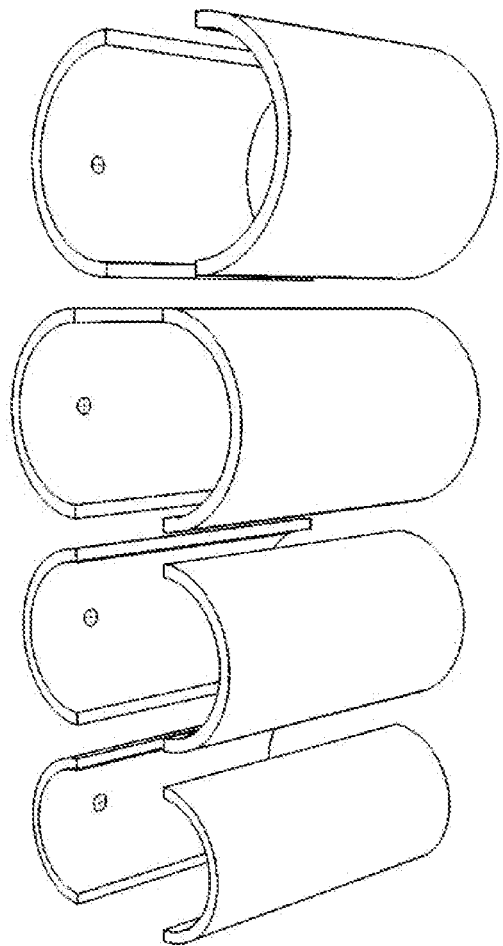
FIG. 28 shows the throat pipe moulds of FIG. 1.

As shown in FIG. 19-FIG. 27, in this example, two pairs of clamp hands are connected with two distance-fixing clamps respectively; a fixed positioning board is connected with the sides of the two distance-fixing clamps through screws. This example is also called multi-angle securing clamp, because many screw holes are set on the fixed positioning board so that the two distance-fixing clamps can be fixed through different screw holes and meet different angles.

If the electric-melting is used as the joining method, the detailed operating process is as follows: the two pairs of clamp hands 1 is pulled open first to open the distance-fixing clamps 2; assemble the throat pipe and fittings together and put them in between the two distance-fixing clamps 2, and then close the clamp hands 1 to close the distance-fixing clamps; after the position of the throat pipe and fittings is fixed, turn on the electric melting machine to heat them; wait until the joint cool down completely, then pull the clamp hands 1 open again to open the distance-fixing clamps 2 and take out the well-connected throat pipe and fittings. If the hot-melting is used, the detailed operating process is as follows: the clamp hands 1 is pulled open first to further open the distance-fixing clamps 2; assemble the throat pipe and fittings together and put them in between the two distance-fixing clamps 2; heat them with the way of hot-melting, and then close the clamp hands 1 to close the distance-fixing clamps 2 in order to fix the position of the throat pipe and fittings; wait until the joint cool down completely, pull the clamp hands 1 open again to open the distance-fixing clamps 2, and take out the well-connected throat pipe and fittings. The two throat pipe moulds 3 can be detached to match the different throat pipe and fittings with different size. Fix the distance-fixing clamps 2 at different screw holes of the fixed positioning board 5, so that different angle between the two distance-fixing clamps can be formed and further match fittings with different angles. The multi-angle securing clamp is used to join fittings for being connected with water pipes, fittings for being connected with water pipes with different diameter, 90 degree bend, and tridents with the same and different diameter.

One skilled in the art will understand that the embodiments of the present invention as shown in the drawings and described above is exemplary only and not intended to be limiting.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A convenient-used securing clamp, comprising:
    two pairs of clamp hands;
    two distance-fixing clamps;
    two groups of throat pipe moulds; and
    a fixed positioning board,
    wherein the distance-fixing clamp is a split structure that consists of two pieces which can be closed together or released;
    the throat pipe mould is set inside the distance-fixing clamp, with the same split structure so that being released and closed along with the distance-fixing clamps;
    the bottom of the two distance-fixing clamps are connected to the two pairs of clamp hands respectively;
    the fixed positioning board, with positioning screw holes on it, is set on the sides of the two distance-fixing clamps for adjusting the angle of the distance-fixing clamps.

2. The convenient-used securing clamp recited in claim 1, wherein the throat pipe mould inside the distance-fixing clamp is five detachable throat pipe moulds with different diameter, assembled together overlapped in the sequence from big to small.

* * * * *